United States Patent
Haskell

(10) Patent No.: US 8,055,949 B2
(45) Date of Patent: Nov. 8, 2011

(54) PROACTIVE SERVER-SIDE ERROR SUBSYSTEM FOR INTERACTIVE OBJECTS

(75) Inventor: Jeff W. Haskell, Austin, TX (US)

(73) Assignee: Sony Online Entertainment LLC, San Diego, CA (US)

( * ) Notice: Subject to any disclaimer, the term of this patent is extended or adjusted under 35 U.S.C. 154(b) by 522 days.

(21) Appl. No.: 11/400,131

(22) Filed: Apr. 7, 2006

(65) Prior Publication Data

US 2007/0260943 A1  Nov. 8, 2007

(51) Int. Cl.
*G06F 11/00* (2006.01)
(52) U.S. Cl. .......................... 714/38.1; 714/48; 717/125
(58) Field of Classification Search .................... 714/38, 714/46, 57, 38.1, 38.14; 717/125, 126, 127
See application file for complete search history.

(56) References Cited

U.S. PATENT DOCUMENTS

| | | | | |
|---|---|---|---|---|
| 5,598,333 | A * | 1/1997 | Marsico, Jr. | 714/38 |
| 7,095,416 | B1 * | 8/2006 | Johns et al. | 345/522 |
| 2002/0049962 | A1 * | 4/2002 | Kelbaugh et al. | 717/128 |
| 2006/0253741 | A1 * | 11/2006 | Garakani | 714/38 |

* cited by examiner

*Primary Examiner* — Yolanda L Wilson
(74) *Attorney, Agent, or Firm* — Mark D. Wieczorek, Esq.; Mayer & Williams P.C.

(57) ABSTRACT

A software error subsystem is provided that can log, report, and may optionally correct defective interactive objects in a virtual game environment. The subsystem may form part of a larger and more general logging and error catching system. By automatically correcting certain defects, recourse to redevelopment efforts can be postponed or eliminated. Even if error correction is not automatically performed, a more specific and helpful error message may be generated and displayed to the player, increasing player satisfaction.

37 Claims, 3 Drawing Sheets

PROACTIVE SERVER-SIDE ERROR SUBSYSTEM FOR INTERACTIVE OBJECTS

BACKGROUND

Massively multiplayer online games ("MMO"s) provide virtual software environments where users can interact with each other through virtual player characters. The player characters can also interact with non-player characters ("NPC"), objects, and geometric structures within the software environment. Player characters often interact with an object or other feature by placing themselves in a range of positions relative to it. For example, to interact with an object, a player character would move near to the object, target the object, and then perform any of several functions on the object, such as: examine the object, pick up the object, manipulate the object, place the object into inventory, use the object, etc.

A problem may arise when an object is disposed too close to, on, or in a geometric structure such as a wall, building, plant, etc. In this case a player character may not be able to interact with the object because the game engine detects that the geometric structure is obstructing this interaction. This may not be the intention of the game designer, however.

For example, an object may be disposed on a tree and well within the reach of the player character. Nevertheless, the game engine may detect the tree as an obstruction and generate an error if the player attempts to interact with the object. In other words, the player character ought to be able to interact with the object, but is prevented from doing so because the object has been improperly placed with respect to the geometric structure. In other cases, one type of interaction is permitted, such as targeting, but another is prohibited, such as harvesting.

Similar problematic situations occur with respect to other player interactions with objects, such as when the level of player interaction is mediated by a player feature, such as attainment of a certain level. If the level is improperly ascertained, interaction with the object will be improper.

When errors are generated in the above systems, such as in the case where the system perceives the player character to be in an incorrect position to interact with an object, the error is typically a general error that is unhelpful to the player, and does not give the player confidence that the error is being addressed. When interaction with objects is improper, as described above, the player may not even be aware that an error has occurred.

SUMMARY

A software error subsystem is provided that can log, report, and may optionally correct defective interactive objects in a virtual game environment. The subsystem may form part of a larger and more general logging and error catching system. By automatically correcting certain defects, recourse to redevelopment efforts can be postponed or eliminated. Even if error correction is not automatically performed, a more specific and helpful error message may be generated and displayed to the player, increasing player satisfaction.

In one aspect, the invention is directed to a method of treating defects in user interactions with interactive objects in a virtual environment. The method includes the steps of receiving an error message after an unsuccessful attempt by a user to interact with an object and determining if the attempt was unsuccessful due to a defect associated with the object. If the attempt was unsuccessful due to a defect associated with the object, then the error message is stored in an error log along with information about the object and a user message is displayed associated with the stored error message. The above method may also be implemented in a computer-readable medium having computer-executable instructions for performing the above steps.

Implementations of the method may include one or more of the following. The method may further include determining if the stored error message corresponds to the same object, or class of objects, as that of another stored message in the error log. If the stored error message corresponds to the same object, or class of objects, as that of another stored error message, then a user message is displayed associated with the stored error message. If the stored error message does not correspond to the same object, or class of objects, as that of another stored error message, then a new user message is created associated with the stored error message and the new user message is displayed. Each error message in the error log, pertaining to a defective object, may have an associated user message. Each user message may provide information about the source of the associated defect. The step of determining if the object has a defect further may include determining a geometric relationship between the object and a player character controlled by the user and determining if obstacles or structures between the object and a player character constitute valid or nuisance obstructions to the attempted interaction. If obstacles or structures constitute valid obstructions to the attempted interaction, then the object does not have a defect. However, if obstacles or structures constitute nuisance obstructions to the attempted interaction, then the object has a defect. The step of determining a geometric relationship between a player character and the object may also include determining the distance between the player character and the object or an orientation of the player character relative to the object. The error log may be specific to the defect treatment method or general to the virtual environment. The attempt by a user to interact with an object may be, e.g., targeting the object, clicking on the object, focusing the object, rolling over the object, harvesting the object, picking up the object, etc. The virtual environment may be a video game such as a massively multiplayer online game. The method may further include tallying the number of error messages created for each object, and once the number exceeds a threshold, creating a report of the error messages and the object.

In another aspect, the invention is directed to a method of treating defects in user interactions with interactive objects in a virtual environment. The method includes steps of receiving an error message after an unsuccessful attempt by a user to interact with an object; determining if the attempt was unsuccessful due to a defect associated with the object; and if the attempt was unsuccessful due to a defect associated with the object, then rendering the attempt successful and allowing the user to interact with the object as attempted.

Implementations of the method may include one or more of the following. The method may further include the step of storing the error message in an error log along with information about the object. The step of rendering the attempt successful may include allowing proper use of the object or moving the object to a location where the object is no longer associated with a defect.

In yet another aspect, the invention is directed to a system for treatment of defective objects in a virtual environment. The system includes an error subsystem module configured to address at least one error that is generated when a user attempts to interact with an object. The error subsystem module stores the error generated in a log and, if the error corresponds to a pattern, displays an error message corresponding to the object or to the pattern.

Implementations of the system may include one or more of the following. The error subsystem module may be further configured to determine if the error is caused by a defect associated with the object. The error subsystem module may be further configured to determine if the error is caused by a failure with a trigger's proximity detection or other general trigger malfunction. The error subsystem module may be further configured to determine a geometric relationship between the object and a player as described above. The error subsystem module may be further configured to tally the number of error messages created for each object, and once the number exceeds a threshold, create a report of the error messages and the object.

In another aspect, the invention is directed to a system for treatment of defective objects in a virtual environment. The system includes an error subsystem module configured to: address at least one error that is generated when a user attempts to interact with an object; determine if the error was due to a defect associated with the object; and if the error was due to a defect associated with the object, then respond to the generated error by allowing the attempted interaction. The error subsystem module may be, in one implementation, further configured to store the error generated in a log.

DETAILED DESCRIPTION

The following definitions are employed in this description of an error subsystem 20.

An "object" is a resource, feature, trigger, NPC, or player character, etc., with which a player character may interact. Commonly, objects are resources that appear in a game which a player attempts to pick up or otherwise manipulate. However, an object can also be a trigger, i.e., a location in the world that when entered by a player causes an action to occur.

To "interact" means for a player character to perform some action with an object. The interaction may be to target an object, pick up an object, put an object into inventory, take an object out of inventory, harvest an object, or other such actions. In many cases, the object must be initially targeted prior to performing additional interactions. In other cases, a player character's movement may interact with an object, such as when a player character's position coincides with that of a trigger. Similarly, some objects are such that a player character moving over the same, causes a resource or reward to automatically be placed in their inventory or a change in player attribute value, or both, as a result. In this description, if the player cannot complete an interaction due to a defect, the interaction is said to be an attempted interaction.

A "defect" or a "defective object" means an object as defined above that does not work as intended. In many cases, the defect is not with the object itself but with the object's placement relative to objects or structures around, on, near, or adjacent the object. Objects may also be defective based on their interaction within a character's inventory or their interactivity given any prerequisite tasks the player may have completed. These aspects are described in greater detail below.

Figure 1:
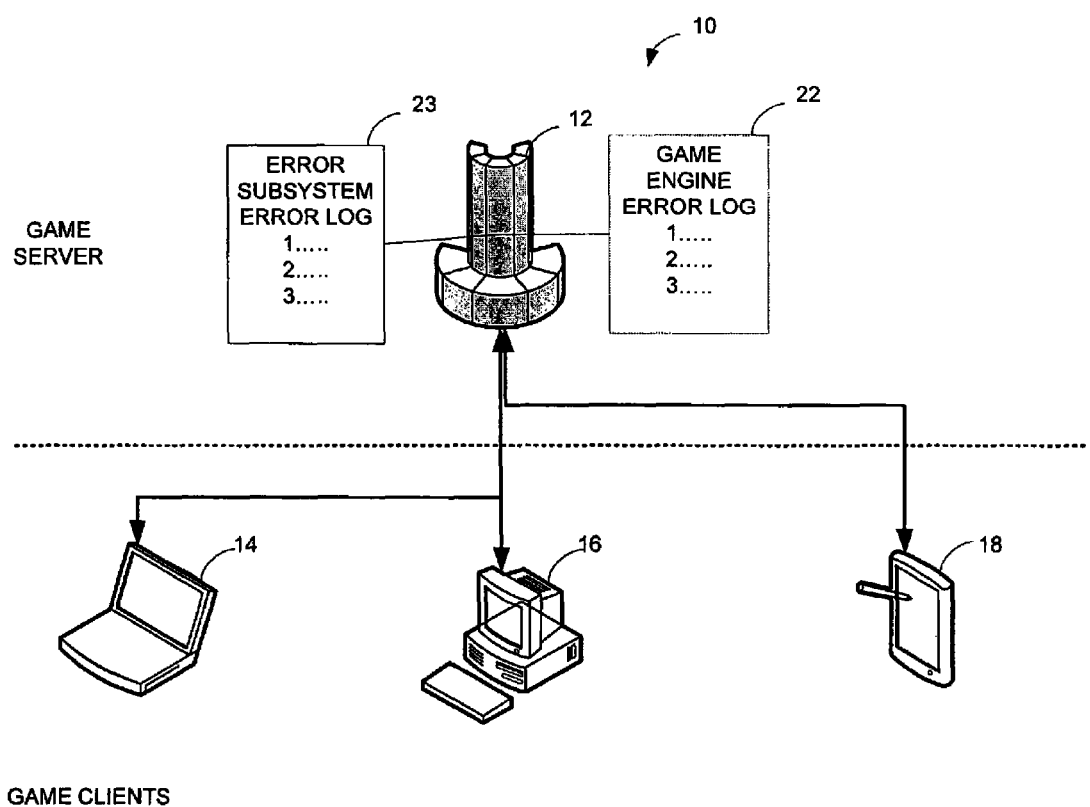
FIG. 1 shows a game server/game client system according to an embodiment of the invention.

Referring to FIG. 1, a system 10 which employs an embodiment of the invention is shown. A game server 12 services a number of game clients 14, 16, 18. The game server 12 runs the game engine application, maintains the overall game virtual environment, and sends information to the game clients pertinent to the player characters and environment local to the client. If a player attempts to direct a character to perform an action not allowed by the game server, an error log is generated either within the game engine (error log 22) or within an error subsystem (error log 23).

In more detail, many complex systems depend on "logging" or "error catching" which reports errors that occur when systems fail. Logging allows developers to quickly read where problems occur and where corrective action is needed. The game engine may employ a sophisticated overall logging routine, and smaller subsystems within a server or client system may have logging routines of their own. The logging of the error generated by the game engine may either be performed by the system log 22, such as is associated with the game engine, or by the separate log 23 within the error subsystem. The remainder of this description will refer to error subsystem log 23, but it should be clear that either, or alternative, error logs may be employed.

As an example of the type of problem addressed by the error subsystem, a player may attempt to interact with an object within a virtual environment. This attempt may be by way of an attempt to target or "click on" the object. The interaction may not be allowed because the game engine may determine that the object is out of the player character's reach or cannot be seen by the player character. If the object is not out of reach of the player, or is clearly visible to the player character, then the failure of the interaction is due to a defect as defined above. The game engine reacts by generating an error which is then logged on error log 23.

The error may be communicated immediately to the development team, or the same may review the error log periodically to determine and prioritize where redevelopment efforts should be expended. If the log shows that multiple errors of the same type and resulting from similar situations and objects have occurred, then this may be evidence that a defect is present that should be addressed by a redevelopment effort.

Figure 2:
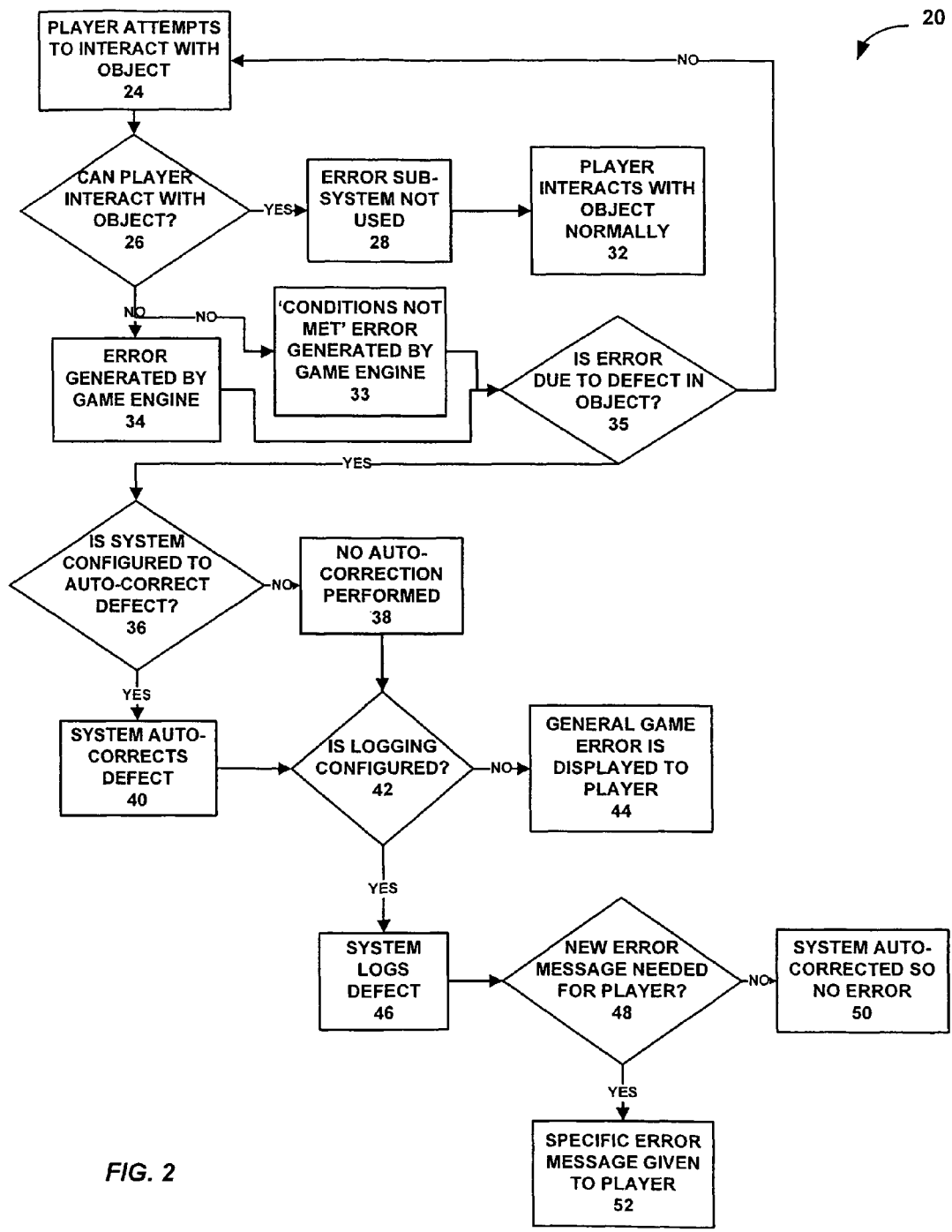
FIG. 2 is a flowchart illustrating a method according to a first embodiment of the invention.

Referring to FIG. 2, a method 20 according to a first embodiment of the error subsystem is illustrated that addresses such errors. First, a player character attempts to interact with an object (step 24). If the player can interact with the object (the YES branch of step 26), then the error subsystem is not used (step 28) and the player character can interact with the object normally (step 32).

If the player character cannot interact with the object (the NO branch of step 26), then an error is generated by the game engine (step 34). Player inability to interact with an object may be undesiredly caused by a defect in the object or may be properly caused by the rules of the game. Thus, a check is performed to determine whether a defect exists in the player character interaction with the object (step 35). If the object is not defective, then the remainder of the error subsystem is skipped and the player can continue to attempt to interact with the object (step 24) or can resume game play without interaction with the object. While the thoroughness of the error generation system is determined by the specific development configuration, it is preferred that a check would be made of every failed or denied interaction.

If the object has a defect, then the error subsystem checks to see if an automatic error correction subroutine is configured (step 36). The automatic correction of a defect (step 40) may occur in a number of ways. One simple way to correct a defect is to grant the player character the attempted access to the object. For example, the player is given access to the object, can target the object, pick up the object, etc. In some cases, this means that the structure inhibiting player interaction with the object is ignored by the game engine. In any case, the attempted interaction is allowed.

In an alternative embodiment, the object is moved to a position, preferably near to the original position, where the defect no longer exists, i.e., where the player can interact with the object as they would in the absence of the defect.

If the system is configured for automatic correction of the defect, then the correction is performed (step 40). If the system is not so configured, then no correction can be performed (step 38) and the method 20 continues with the defect uncorrected.

Whether or not the defect is corrected, the error subsystem checks to see if error logging is configured (step 42). If error logging is not configured, then an error message may be displayed to the player (step 44). As details about the error have not been determined, the error message will be general and non-specific. If error logging is configured, then the error subsystem logs the defect (step 46) in the error log 23.

Next, the error subsystem 20 determines if a specific error message can be delivered to the player (step 48). In the case where the system automatically corrected the defect, then no error message is needed (step 50). Where the system has not automatically corrected the error, the error log is checked to see if the defect follows a known pattern and if a more specific user message has been developed for the defective object or alternatively for a defective class of objects. If so, then the specific user message may be delivered to the player (step 52). As the player is made aware that the system knows of the error, and that the error will be reported to the development team, the player has greater confidence that steps will be taken to address the error.

Figure 3:
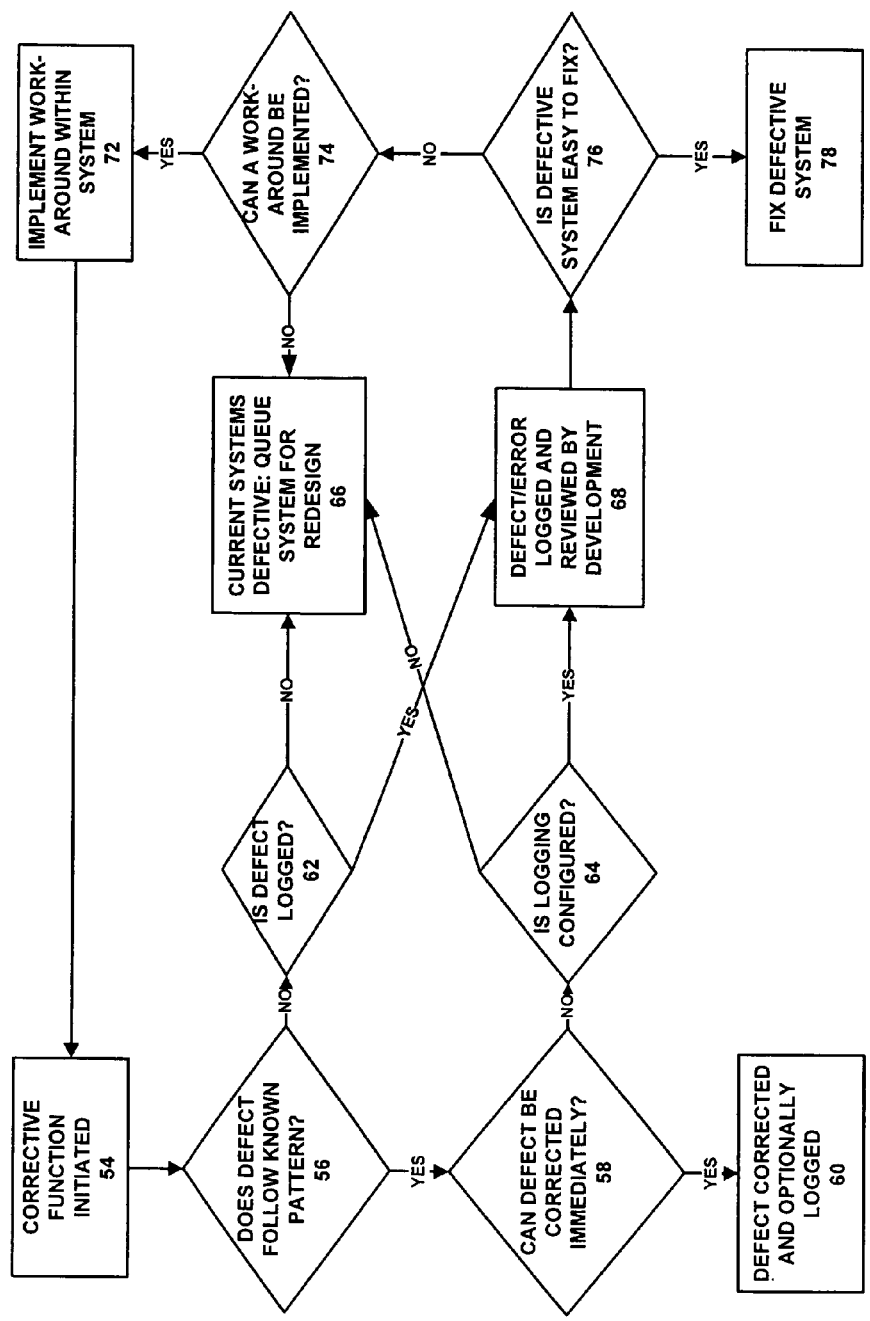
FIG. 3 is a flowchart illustrating a method according to a second embodiment of the invention.

Additional details about logging, the provision of specific error messages, and optional automatic defect correction are shown in FIG. 3. If a defect is found, the error subsystem routine is called (step 54). First, the defect resulting in an error is checked to see if it follows a known pattern (step 56). In other words, the error is checked to see if it is similar to other errors that have been noted, determined to form a pattern, and possibly corrected. For example, the error is checked to see if it corresponds to the same object or class of objects to which other errors correspond. Similarly, the error may be checked to determine if it corresponds to similar objects or if it occurs around similar structures or surrounding objects.

If the error follows a known pattern, the error subsystem checks to see if the defect can be automatically corrected (step 58). If so, the defect is corrected automatically, the error may optionally be logged (step 60), and no user message need be delivered to the player. In this case, the automatic correction would be performed dynamically, in response to the error message, soon after the defect is detected, and without recourse to redevelopment efforts. As a particular advantage, the player is not bothered with user messages. Moreover, if the same error occurs again, then the same automatic correction routine can be employed to provide a solution. Generally, such solutions or routines may be stored on the server.

Moreover, if an analogous error is generated that relates to a similarly defective object, then the system may be configured to simply add additional conditions to the previously-developed solution. The optional logging (step 60) allows for future development work to correct the error, if desired, although the automatic correction is in place to handle the errors.

It is noted that error pattern recognition is generally important for the subsystem to function. However, the act of receiving an error, regardless of what that error is, is in fact a pattern itself and that error could be logged. The level of proactive error reporting depends on how well the entire error pattern is known. However, the logging functionality need only recognize that an error was generated.

If the error is not immediately correctable, then a check is made as to whether logging is configured (step 64). If logging is configured, then the error corresponding to the defect is logged, e.g., in error log 23. The error and error log may be immediately reported to a development team (step 68) or defect database, or kept for later review by the same. As the error follows a known pattern, a more specific error message corresponding to the known pattern may be developed and displayed to the player. Alternatively, if a more specific error message corresponding to the known pattern has already been developed, then the same may be simply displayed to the player. In either case, the player is made aware that the development team has been notified of the error, increasing player satisfaction.

If a logging routine is not configured, then the defective object may be simply queued for later redesign (step 66). In this case, a general user message corresponding to the error may be delivered to the player.

Following the logging of the defect and resulting error, a check is made as to whether the defect can be repaired in a relatively simple and straightforward, but not automatic way (step 76). In this step, a developer would evaluate the needed fix or correction and make a decision as to whether to create such a fix, to create a work-around, or wait for large-scale redesign efforts. If the defect can be corrected in a simple and straightforward manner, then such correction is performed (step 78). An appropriate notation may be made in the error log so that future occurrences of errors due to this defect may employ the same solution, if possible.

If the defect is not corrected automatically, nor a straightforward solution developed, then a check is made as to whether a work-around can be implemented (step 74). As used here, a "work-around" is a solution that can be implemented to allow players to interact with the defective object, but that is generally more superficial than repairing the underlying problematic object. For example, in a fantasy game, a particular article of clothing may afford a character special powers, but may cover up and undesiredly disable another interactive object the player is wearing, rendering the same defective. A work-around may be to remove parts of the offending article of clothing to render the interactive objects non-defective. In general, if a work-around is possible, then the same is directed to be created and implemented (step 72).

If a work-around cannot be implemented, then again the object is queued for redesign efforts (step 66). As above, the user message sent to the player in this case may be general and would remain the same until the pattern was configured into the subsystem. For example, once the defect is logged, a more specific user message could be delivered to the player, since more is known about the defect. At the least, the logging lets the player know the problem is being addressed.

Returning to the decision point of whether the error follows a known pattern (step 56), if the answer is NO, then the next check is whether the error has been logged before (step 62). If so, the method branches to development review (step 68) and continues from there as described above. If the defect has not been logged, then again the system is queued for redesign efforts (step 66).

The following is an example of the method where an interactive rock is defective. An attempted player interaction with a defective rock leads to an exception "exceptionX" being generated. Rather than immediately display a vague user message corresponding to the error "vagueError", the display of a user message corresponding to the error "vagueError" is delayed. If the defective interaction follows a pattern the error subsystem is looking for, corrective measures are taken, logging performed, and a more specific user message is displayed.

Variations of the above are described below.

In one related embodiment, unique object serial numbers are employed for each object. In this case, a tally may be automatically maintained within the error log of the number of error messages corresponding to each object. When a redevelopment effort is undertaken, the tally may be used as a guide to which objects' repair is most urgent. This embodiment also allows a more specific error message to be provided, such as "We know about the problem with this object and plan to repair it soon."

The user message can vary from general to specific. One user message could state that the "rock" is defective because the error subsystem determined that the object in question was a rock. In another case, the error subsystem could call the object an "unknown object" or just an "object". The level of complexity is dependent on the developer. The information about the object stored could be minimal or could include, e.g., object name, type, object serial number, location, statistics, important variables, etc. In general, more specificity increases player satisfaction with the error message. Thus, in one optimal case, a specific error is provided in the error log on a per-object basis, and either a specific user message is displayed to the player or an automatic corrective action is taken. In a more minimal case, a general error message is given with no greater specificity than that provided in the absence of the error subsystem. However, even in this minimal case, the defect has been discerned and the error reported.

In certain cases within some embodiments, automatic error correction is undesired. For example, if game rules dictate that a player should not be able to access an object because their player character is on the wrong level or of the wrong profession, then the error subsystem would act contrary to the intent of the designers. In this case, the error subsystem may be simply configured to display a proactive error message and to log the player data, rather than providing automatic error correction. This may also be instituted if part of the game requires precise or highly-accurate player character interaction with objects, e.g., to increase the level of difficulty of the game.

That an object has a defect (step 35 of FIG. 2) may be determined in a number of ways. In one embodiment, the error subsystem evaluates the object, its geometric relationship to the player character, e.g., its proximity to the character, and the mode of interaction the player is attempting. For example, the object's current location or orientation relative to the player character and other objects could be evaluated. Based on the evaluation, the player character may be determined to be in a proper position to interact with the object. In other words, the player character can see and reach the object, and ought to be able to interact with it properly without impediment. That the player character cannot means there is a defect with the object.

Various types of defects are described below. Of course, not all errors result from defects. For example, one error may be that the player character is too far away from the object to interact with it, or an insurmountable obstruction may be between the player character and the object. In this case, an error may result in a user message such as "You are too far away to interact with that." but the error subsystem routine would not be called.

In one type of defect, other objects or structures may "clip" with the object, which means that the object and structure are close enough that they collide with each other and phase into or through each other within the virtual environment, which often makes the world geometry appear unrealistic. In addition, the player character may have consequent difficulty interacting with the object because the game engine determines the object to be, e.g., out-of-reach of the character, unable to be seen by the character, etc.

As noted above, failure to complete a prerequisite task, as perceived by the game engine, may also constitute a defect. For example, a NPC may be considered an interactive object. A NPC looks like a player character but is really just a shell that reacts to player interaction. This NPC might check to make sure the player character has completed a previous quest or is of a certain combat level before giving the player character more dialog. The new dialog allows the player character to progress in their profession, attain a new skill, get equipment or money, etc. The player character may desire to interact with the NPC but cannot because the NPC functionality is defective. The code or functionality attached to the NPC defectively fails to account for the prerequisite quest or combat level being attained by the player character, and so the player character cannot progress. In this, the subsystem may be incorporated to give the player a more proactive and helpful message, increasing player satisfaction. And if for some reason the NPC cannot be repaired, the error subsystem may be employed to provide a solution.

In an analogous way to that described above with respect to resource objects, if the prerequisite is valid, and not merely a "nuisance", then the error subsystem may not determine that the same is a defect, and thus the player will have to complete the prerequisite. However, if the prerequisite is minor, i.e., more of a "nuisance" prerequisite, then the failed interaction may be determined to be a defect and the error subsystem may be used to grant the desired interaction or at least to provide a more proactive error message upon the failed interaction.

For example, during the prerequisite evaluation, in which the NPC code evaluates the player prerequisites, the game may return an error or invalid value. The internal error is caught by the subsystem. In one situation, the NPC object code may be looking for a variable on the player that doesn't exist.

As another example, inappropriate or unforeseen NPC functionality may keep the player from interacting with the NPC, e.g., players may play an instrument and entertain other players. By default, all NPCs in the vicinity of the player entertaining will turn and watch the player. Additionally these NPCs will clap and say dialogue to the entertainer. Because the NPC is too busy watching a player playing an instrument, no other players can interact with the NPC. Also, a player may use a spell or ability or even attack the NPC, making the NPC move from their specified location or killing the NPC altogether. Because the NPC cannot be interacted with, it may send a general error message to the player that says "The NPC is too busy right now." If this is encountered, the system can log the error or automatically correct the error as described above.

Another type of defect occurs when a player character cannot use an item in their inventory. For example, the player may be accustomed to double-clicking on an item in their inventory and having that item perform an action. For example, the player may double-click on a chest plate and expect that the chest plate be equipped onto their player character. However, the chest plate may be defective, e.g., the chest plate requires the player to personalize or tune the armor but the option to personalize the armor was implemented incorrectly. The error subsystem may be employed to evaluate that the interactive inventory object is the defective chest plate and to send a user message to the player stating that a repair for this defective object will be available in a given period of time. The error subsystem may also send a message which communicates steps to work around the defect. Finally, where automatic correction is configured, the error subsystem may carry out the personalization automatically until a larger repair is released.

A further consideration of defects relates to consumable interactive objects, e.g., a rock containing a gold vein. If the vein is mined, the object would be consumed or destroyed in the virtual environment and gold nuggets placed in the player character's inventory. If there is a defect with the vein or the rock, the automatic correction may still allow the mining, but this mining may only be performed once because after that the rock is consumed. In this case, if the player finds another rock with the same defect, then the same previously-developed subsystem may be run again. The same corrective actions may be taken multiple times when the same conditions are encountered.

Yet another type of defect may occur when the interactive object lacks geometric coordinates, causing the math in the game engine to fail.

Other defects will be apparent given this teaching.

Various algorithms based on geometry may be applied to determine if errors due to geometric considerations are real or are caused by defects. For example, the distance between the player character and the object may be calculated, and if the distance is less than a predetermined threshold, then the player character may be given access to the object. Such an algorithm would not, however, allow for, e.g., glass walls to be placed between the player character and the object, through which a player character may see but which would in actuality be a physical impediment to interacting with the object. Thus, besides the distance determination, a separate determination may be made as to the existence and size of any objects intervening between the player character and the object.

For example, an interaction volume may be defined between the player character and the object. The interaction volume may be defined by a perimeter of the player character and a perimeter of the object and may generally extend between the two perimeters. This interaction volume then substantially defines the volume of space between the player character and the object. If any objects, structures, or other features are within this interaction volume, then the same may be impediments to interaction.

A rule may be defined whereby only objects, structures, or other features that are greater than a certain threshold in size or volume, e.g., as a percentage of the interaction volume, may be considered valid obstructions. All objects, structures, or other features that fall below the threshold, if they inhibit interaction, result in the object in question being considered defective, i.e., are nuisance obstructions, and subject to logging and a potential automatic correction.

For all defects, embodiments of the error subsystem may be designed to look for specific exceptions or error and ignore all others. On the other hand, the error subsystem may be configured to evaluate all errors and to determine additional logic is needed. For example, additional logic may provide the error subsystem the intelligence required to examine an error, consider error data, and make a decision based on that data as to what message to display and what to provide the player.

In many cases, however, embodiments will be provided with known issues. For example, if it is known that many players are having difficulties interacting with rocks, then code will be inserted to handle the errors with the rocks thus work around the defect. Later, the same logic may be employed to handle similar errors with terminals. Similarly, the same logic may be used to handle problems with unknown objects, and in this case code may be inserted to capture the unknown object's location and, e.g., serial number. Eventually, based on the error logs, a developer may be able to narrow down all of these to a specific object that is being misplaced in the virtual environment.

Example

The following code gives an example of a player character interacting with an object, in this case harvesting a resource ("loot") adjacent a structure ("rock").

```
Void harvestResourceFromRock ( playerObject player,
interactiveObject rock )
{
    //The system checks for errors before giving the
player his/her loot.
        string possibleError Message = tryToHarvest( rock
);
    //If the system replies with an error, the error
checking method is called.
    {
        runTheMethod ( player, rock );
    }
    Else
    //If there are no errors, players are just given
    their loot and the rock is destroyed //on the
    ground.
    {
        createRockHarvestLootInPlayerInventory( player
);
        destroyTheRockOnTheGround( rock );
    }
}
Void runTheMethod( playerObject player,
interactiveObject rock )
{
    //data from both the interactive object and the
player is retrieved here. Data such
    //as player distance to object might be collected.
        string [ ] objectData =
getAllDataNeededOffOfObject( rock );
        string [ ] playerData =
getAllDataNeededOffOfPlayer( player );
    //data is evaluated here and possible patterns
identified.
        <logic here>
    //An error is found and run through a proactive
function.
        If( specificResultsObjectData ==
DefectiveInteractiveObject )
        {
            //The player is given their loot and the rock
    is destroyed on the ground.
            //The player has no idea an error occurred.
            createRockHarvestLootInPlayerInventory( player
);
            destroyTheRockOnTheGround( rock );
            //The error is logged for review in the
    future.
            logTheError( objectData, playerData);
        }
}
```

The above <logic here> section refers to conditions programmed by the developer to catch, evaluate, and correct specific known issues or errors previously experienced by players and perhaps caught on the error logs. After looking at the unmodified problematic logic or code, the developer has identified a work around and used the subsystem to catch the error and provide a solution.

Various other examples could also be formulated given this teaching.

Moreover, while the invention above has been described as acting on the basis of errors generated, it should be clear that the invention is broader than that. In some cases, the error subsystem may be called specifically when errors are not generated but nevertheless the application is not acting as desired, e.g., because the application logic is lacking data necessary to complete an action. For example, the error subsystem may log all situations in which specific conditions are not met. If the situation met no recognized pattern, then the situation would be evaluated or at least logged by the subsystem. These types of errors are referred to as 'CONDITIONS NOT MET' errors, and are shown in FIG. 2 as step 33, even though an ordinary error would not have been generated. The error subsystem may be configured to detect such situations in which conditions have not been met, and log such errors or automatically correct them as described above.

In one variety of such errors, if a player action or input was unexpected or unaccounted for by the coding, a conditions-not-met error may be generated. For example, a player may be directed to select one of several choices. If the player selects "cancel" instead, failing to make a selection, the application may not account for this choice, but would not typically generate an error. The error subsystem according to the above description may generate a conditions-not-met error and apply the algorithm described to log and possibly correct the same. In the same way, a player character may attempt, knowingly or not, to set off a trigger. If the player character has the correct variable attached to themselves, then the trigger may be set off. If they do not, the trigger is not set off. If the evaluation of the player variables fails, then the error subsystem may be called in response to a generated conditions-not-met error.

Many of these conditions-not-met errors may apply in particular to the interaction of player characters with objects such as NPCs and with NPC recognition of player-achieved prerequisites. For example, in one variety, if the NPC evaluates the player character's prerequisites and finds that one is unknown, a conditions-not-met error may be similarly generated. In a second variety, if an NPC attempts to evaluate a character's prerequisite tasks or quests when the evaluated tasks or quests have not yet been assigned to the character, a conditions-not-met error may be generated.

In a third variety, the task or quest has been completed by the player but the NPC dialogue fails to change or the NPC fails to allow progression or issue a reward. This is often because the task or quest was not marked 'completed' by the game correctly. It may also fail due to the NPC looking for the incorrect completed quest variable or some other problem. Perhaps the player removed or revoked the quest once, started over by getting the quest again and as a result has caused an unexpected error during the quest completion phase. Again, in this situation, a conditions-not-met error may be generated.

In a fourth variety, an NPC responsible for a task or quest may issue a task or quest that is progressed by a trigger, e.g., the player walks through a door or arrives at a location. The trigger may fail to advance the player to the next step of the quest. Returning to the NPC may not advance the player either. Such defects may be caused by defective trigger placement or the trigger functionality itself. As before, a conditions-not-met error may be generated.

In a fifth variety, the NPC may look for an item in the player inventory but the item is actually in the player's backpack or in another container on the player, or was dropped or destroyed. The player thus cannot progress even though prerequisites have been met, leading to a conditions-not-met error.

In a sixth variety, the NPC may move inside another object or may be improperly placed inside geometry, or another player may move an object over the NPC, such as a large pet, a vehicle, their own character model, etc. Alternatively, the NPC may be placed in an inaccessible location by the developer on accident. In all of these cases, the player can target the NPC but cannot interact with the NPC to progress. Such a situation could lead to generation of a conditions-not-met error.

According to the present invention, as fully described above, a system is provided to log errors and deliver user messages so that player satisfaction is increased and game play is improved. The system may also automatically correct defects in the user interaction with objects so that users can perform a desired interaction.

The automatic correction operates on the server side and allows defective interaction repair without resorting to immediate redevelopment efforts. Existing logging tools are employed to make note of recurrent errors. The errors are tested to determine if they are the result of defective interactions. If so, a specific error message may be pro-actively communicated to the user or in some cases the defect may be automatically corrected by allowing the user the desired interaction with the object.

While the invention has been described in the context of MMOs, it should be clear to one of ordinary skill in the art, given this teaching, that the invention is much broader than the embodiments shown. In particular, any software that uses dynamic placement of interactive objects within a virtual environment may benefit from incorporation of the error subsystem. The MMO embodiment, being online, can communicate error messages and repairs immediately; however, non-online games can also benefit, either from repairs done when the user is online or by automatic repairs performed without the need for an online connection. Further, while the system described here pertains to role-playing games, non-role-playing games, or indeed entirely different applications, may also benefit from the invention. Yet further, the invention need not only be implemented in new applications; rather, the invention may be integrated with previously-coded or legacy applications. The invention may be implemented in any programming language, including object-oriented programming languages. The invention may be configured for only error-catching and logging, or for error-catching, logging, and pro-active error communication, or for error-catching, logging, and automatic defect correction. Indeed, any combination of these may be employed according to the situation and results desired. For example, the system may correct defects without performing any logging steps.

Accordingly, the scope of the invention is limited only by the claims appended hereto.

The invention claimed is:

1. A method of treating defects in user interactions with interactive objects in a virtual environment, comprising:
   a. generating an error message by a gaming engine after an unsuccessful attempt by a user to interact with an object;
   b. receiving the error message in an error subsystem after the unsuccessful attempt by a user to interact with an object;
   c. determining if the attempt was unsuccessful due to a defect associated with the object;
   d. if the attempt was unsuccessful due to a defect associated with the object, then:
      i. storing the error message in an error log along with information about the object; and
      ii. displaying a user message associated with the stored error message to the user.

2. The method of claim 1, wherein the error message is that certain conditions were not met.

3. The method of claim 2, wherein the conditions pertain to prerequisite tasks or quests evaluated by an NPC object.

4. The method of claim 1, further comprising
   a. determining if the stored error message corresponds to the same object, or class of objects, as that of another stored message in the error log;
   b. if the stored error message corresponds to the same object, or class of objects, as that of another stored error message, then displaying a user message associated with the stored error message;
   c. if the stored error message does not correspond to the same object, or class of objects, as that of another stored error message, then creating a new user message associated with the stored error message and displaying the new user message.

5. The method of claim 1, wherein each error message in the error log, pertaining to a defective object, has an associated user message.

6. The method of claim 5, wherein each user message provides information about the source of the associated defect.

7. The method of claim 1, wherein the determining if the object has a defect further comprises:
   a. determining a geometric relationship between the object and a player character controlled by the user;
   b. determining if obstacles or structures between the object and a player character constitute valid or nuisance obstructions to the attempted interaction;
   c. if obstacles or structures constitute valid obstructions to the attempted interaction, then determining that the object does not have a defect;
   d. if obstacles or structures constitute nuisance obstructions to the attempted interaction, then determining that the object has a defect.

8. The method of claim 7, wherein the determining a geometric relationship between a player character and the object includes determining the distance between the player character and the object or an orientation of the player character relative to the object.

9. The method of claim 1, wherein the error log is specific to the defect treatment method.

10. The method of claim 1, wherein the error log is general to the virtual environment.

11. The method of claim 1, wherein the attempt by a user to interact with an object is selected from the group consisting of: targeting the object, clicking on the object, focusing the object, rolling over the object, harvesting the object, picking up the object.

12. The method of claim 1, wherein the virtual environment is a video game.

13. The method of claim 12, wherein the game is a massively multiplayer online game.

14. The method of claim 1, further comprising tallying the number of error messages created for each object, and once the number exceeds a threshold, creating a report of the error messages and the object.

15. The method of claim 1, wherein the defect associated with the object is that the object does not work as intended within a player character inventory.

16. The method of claim 1, wherein the interactive object is a non-player character.

17. The method of claim 16, wherein the non-player character defectively fails to recognize player-achieved prerequisite tasks.

18. The method of claim 1, wherein the defect associated with the object is that the attempted interaction with the object defectively fails to recognize player-achieved prerequisite tasks.

19. A non-transitory computer-readable medium having computer-executable instructions for performing steps recited in claim 1.

20. A method of treating defects in user interactions with interactive objects in a virtual environment, comprising:
   a. receiving an error message in an error subsystem after an unsuccessful attempt by a user to interact with an object;
   b. determining if the attempt was unsuccessful due to a defect associated with the object;
   c. if the attempt was unsuccessful due to a defect associated with the object, then rendering the attempt successful by an automatic error correction subroutine and allowing the user to interact with the object as attempted.

21. The method of claim 20, wherein the error message is that certain conditions were not met.

22. The method of claim 21, wherein the conditions pertain to prerequisite tasks or quests evaluated by an NPC object.

23. The method of claim 20, further comprising storing the error message in an error log along with information about the object.

24. The method of claim 20, wherein the rendering the attempt successful includes moving the object to a location where the object is no longer associated with a defect.

25. The method of claim 20, wherein the defect associated with the object is that the object does not work as intended within a player character inventory.

26. The method of claim 20, wherein the interactive object is a non-player character.

27. The method of claim 26, wherein the non-player character defectively fails to recognize player-achieved prerequisite tasks.

28. A system for treatment of defective objects in a virtual environment, comprising:
   a. an error subsystem module embodied on a non-transitory computer-readable medium configured to address at least one error that is generated when a user attempts to interact with an object;
   b. such that the error subsystem module stores the error generated in a log and, if the error corresponds to a pattern, displays an error message corresponding to the object or to the pattern.

29. The system of claim 28, wherein the error subsystem module is further configured to determine if the error is caused by a defect associated with the object.

30. The system of claim 29, wherein the error subsystem module is configured to determine by performing the steps of:
   a. determining a geometric relationship between the object and a player character controlled by the user;
   b. determining if obstacles or structures between the object and a player character constitute valid or nuisance obstructions to the attempted interaction;
   c. if obstacles or structures constitute valid obstructions to the attempted interaction, then determining that the object does not have a defect;
   d. if obstacles or structures constitute nuisance obstructions to the attempted interaction, then determining that the object has a defect.

31. The system of claim 30, wherein the error subsystem module is further configured to tally the number of error messages created for each object, and once the number exceeds a threshold, create a report of the error messages and the object.

32. The system of claim 29, wherein the error subsystem module is configured to determine by performing the steps of:
   a. determining what prerequisites exist for the interaction between the object and a player character controlled by the user;
   b. determining if any prerequisites, that are lacking for the attempted interaction, constitute valid or nuisance prerequisites to the attempted interaction;
   c. if prerequisites constitute valid prerequisites to the attempted interaction, then determining that the object does not have a defect;
   d. if prerequisites constitute nuisance prerequisites to the attempted interaction, then determining that the object has a defect.

33. The system of claim 32, wherein the error is an internal programming error or an external game system error which is encountered during an evaluation of the prerequisites.

34. The system of claim 32, wherein the error is caused by unknown or unexpected conditions during an evaluation of the prerequisites.

35. The system of claim 32, wherein the object is a non-player character.

36. A system for treatment of defective objects in a virtual environment, comprising:
   an error subsystem module embodied on a non-transitory computer-readable medium configured to:
      i. address at least one error that is generated when a user attempts to interact with an object;
      ii. determine if the error was due to a defect associated with the object;
      iii. if the error was due to a defect associated with the object, then, by use of an automatic error correction subroutine, automatically respond to the generated error by allowing the attempted interaction.

37. The system of claim 36, wherein the error subsystem module is further configured to store the error generated in a log.

* * * * *